United States Patent [19]
Spry

[11] 3,907,785

[45] Sept. 23, 1975

[54] TRICYCLIC CEPHALOSPORINS

[75] Inventor: Douglas O. Spry, Indianapolis, Ind.

[73] Assignee: Eli Lilly and Company, Indianapolis, Ind.

[22] Filed: July 17, 1973

[21] Appl. No.: 380,012

[52] U.S. Cl. .............................. 260/243 C; 424/246
[51] Int. Cl.² ...................................... C07D 501/20
[58] Field of Search ................................ 260/243 C

[56] References Cited
UNITED STATES PATENTS

| | | | |
|---|---|---|---|
| 3,660,395 | 5/1972 | Wright et al. | 260/243 C |
| 3,660,396 | 5/1972 | Wright | 260/243 C |

*Primary Examiner*—Nicholas S. Rizzo
*Attorney, Agent, or Firm*—William B. Scanlon; Everet F. Smith

[57] ABSTRACT

2-Acylamino-6a,7-didehydro-5,5-disubstituted-cyclopenta[b]cepham-7-carboxylic acids and esters are prepared by intramolecular cyclization of 3-bromomethyl-2-(substituted ethyl)-3-cepham sulfoxides to provide tricyclic cephalosporin antibiotics.

16 Claims, No Drawings

TRICYCLIC CEPHALOSPORINS

BACKGROUND OF THE INVENTION

In the chemical modifications of cephalosporin antibiotics another type of substitution at carbon atom C-2 was discovered when a cephalosporin was reacted under Mannich conditions to give a product which did not contain the usual β-substituted amino group of the normal Mannich reaction products. The identification of a methylene group at the C-2-carbon of the dihydrothiazide ring indicated the expected amino group had been eliminated under reaction conditions. The preparation of the 2-methylene cephalosporins was described by Wright, et al., *J. Med. Chem.*, 14, 426 (1971). The cephalosporin exocyclic methylene at C-2 was found to undergo certain addition reactions. Bromine and thiols were added under mild conditions. However, amines or alcohols did not add to the methylene at C-2 under the conditions studied.

It has been found that certain active methylene carbanions will undergo a Michael type addition with 3-methyl-2-methylene-3-cephem sulfoxides to provide 3-methyl-2-(substituted ethyl)-3-cephem sulfoxides. When the 3-methyl group of the cephalosporin Michael adducts is brominated and a carbanion is generated at the adduct methyne, such Michael adducts undergo an intramolecular cyclization to produce novel tricyclic cephalosporins with antibiotic properties. The tricyclic cephalosporins are named as 2-acylamino-6a,7-didehydro-5,5-(disubstituted)-cyclopenta[b]cepham-7-carboxylic acid derivatives.

It is an object of this invention to provide antibiotic 2-acylamino-6a,7-didehydro-5,5-(disubstituted)-cyclopenta[b]cepham-7-carboxylic acids which employ as starting materials the 3-methyl-3-cephem Michael adducts.

In the chemical modification of cephalosporins it is often desirable to cleave the 7-carboxamido group to obtain a free amino group in the 7-position. One method of cleaving an amido group to obtain the free amine is that described by Lander, *J. Chem. Soc.*, 83, 320 (1903). In accordance with Lander's method the amide is treated with a halogenating agent to convert the amido group to an imino halide and the imino halide is treated with an alcohol to obtain the imino ether which is then hydrolyzed to the free amine. The application of this method to the cleavage of cephalosporin C to 7-aminocephalosporanic acid (7-ACA) is disclosed in Canadian Patent 770,125 and British Patent 1,041,985.

Cleavage of the carboxamido group of the 2-acylamino-6,7-didehydro-5,5-(disubstituted)cyclopenta[b]cepham compounds of this invention provides the 2-amino-6-a,-7-didehydro-5,5-(disubstituted)-cyclopenta[b]cepham compounds described herein. Such a tricyclic cephalosporin "nucleus" is useful for generating further 2-acylamino-5,5-(disubstituted)-cyclopenta[b]-cephem compounds of the instant invention.

SUMMARY OF THE INVENTION

The compounds provided by this invention are represented by the following formula:

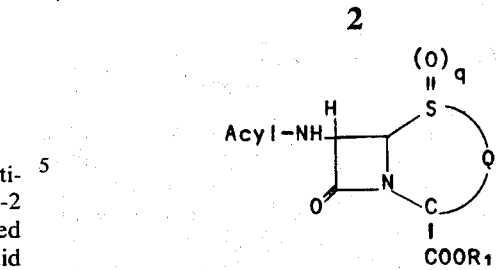

wherein the term "acyl" represents a wide variety of known side chains of the cephalosporin antibiotics such as phenylacetyl, phenylmercaptoacetyl, phenylglycyl, mandelyl, and the like; $R_1$ represents hydrogen, an alkali or alkaline earth metal cation or an anhydride or ester forming moiety and preferably one which is easily removed so as to provide the biologically active acid form of the desired antibiotic; $q$ is 0 or 1 indicating the sulfide or sulfoxide state of the sulfur atom; Q represents a 5-membered carbocyclic moiety such as

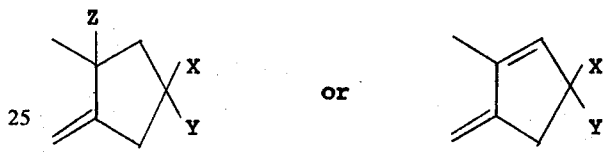

wherein X and Y independently represent acetyl, carbethoxy, carbomethoxy, carboxy, cyano, or 2,2,2-trichloroethoxycarbonyl; and Z is hydrogen or bromine.

As used herein, the term "tricyclic cephalosporin" indicates a compound in which a cyclopentane ring is fused to the cepham dihydrothiazine moiety at the C-2 and C-3 carbon atoms. The name "cyclopenta[b]cepham" indicates such a saturated fused ring system, shown below with its numbering order.

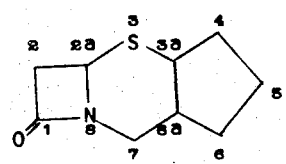

Unsaturation in such a molecule is indicated by the term "dehydro", numbered according to the carbon atoms where the unsaturation occurs. For example, the name 6a,7-didehydrocyclopenta[b]cepham indicates the unsaturated tricyclic cephalosporin ring system shown below.

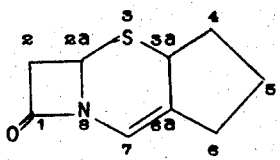

Similarly the name 3a,4,6a,7-tetrahydrocyclopenta[b]cepham indicates the multiple unsaturated tricyclic cephalosporin ring system shown below.

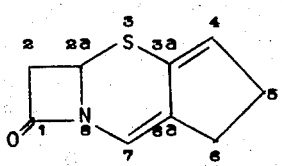

The term "tricyclicdiene" as used herein refers to the 3a,4,6a,7-tetrahydrocyclopenta[b]cepham compounds.

The compounds of the invention exhibit the usual infrared absorption exhibited by the unsubstituted cephalosporanic acids. In addition, the structure of the tricyclic cephalosporins is supported by the proton magnetic resonance spectra (NMR) which exhibit contributions from the carbocyclic moiety represented by Q.

The tricyclic cephalosporins provided by this invention inhibit the growth of gram-positive organisms.

DETAILED DESCRIPTION OF THE INVENTION

The tricyclic cephalosporins of the present invention are represented by Formula I:

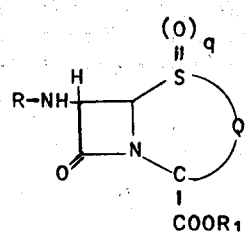

Formula I wherein R is hydrogen, $C_1$-$C_8$ alkanoyl, benzoyl, or a group represented by the formula:

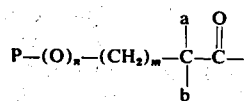

wherein
P is 2-thienyl, 3-thienyl, 2-furyl, 3-furyl, phenyl or phenyl substituted by amino, protected amino, $C_1$-$C_4$ lower alkyl, $C_1$-$C_4$ lower alkoxy, halogen, hydroxy, or protected hydroxy;
$a$ is hydrogen or $C_1$-$C_3$ alkyl;
$b$ is hydrogen or $C_1$-$C_3$ alkyl, amino, protected amino, hydroxy or protected hydroxy;
$m$ is 0 or an integer from 1 to 3;
$n$ is 0 or 1;
subject to the limitation that when $n$ is 1,
P is phenyl or substituted phenyl and
$b$ is hydrogen or $C_1$-$C_3$ alkyl;
$R_1$ is hydrogen, a carboxylic acid protecting group, or an alkali metal or alkaline earth metal cation;
$q$ is 0 or 1;
Q is

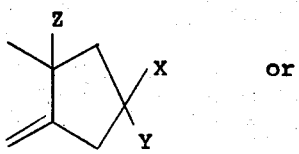 or 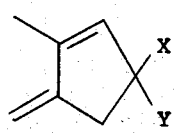

wherein
X and Y are independently acetyl, benzoyl, carbethoxy, carbomethoxy, carboxy, cyano or 2,2,2-trichloroethoxycarbonyl; and
Z is hydrogen or bromine;

subject to the limitations that when Z is bromine, $q$ is 1 and X and Y are other than carboxy or cyano; and subject to the further limitation that $q$ is 0 when Q is

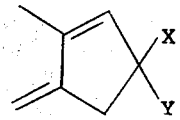

As used herein, the term "$C_1$-$C_8$ alkanoyl" refers to formyl, acetyl, propionyl, butyryl, pivaloyl, hexanoyl, heptanoyl and like groups represented by the formula

where $R_4$ is hydrogen or a straight or branched chain alkyl group having from 1 to 7 carbon atoms.

Representative of the 7-acyl group R, when R is

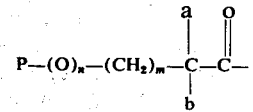

are phenylacetyl, phenoxyacetyl, 2-thienylacetyl, 3-thienylacetyl, 2-furylacetyl, 3-furylacetyl, 4-methylphenylacetyl, 4-methoxy-3-ethoxyphenylacetyl, phenylglycyl, β-phenylpropionyl, α-methylphenylacetyl, α,α-dimethylphenylacetyl, α-hydroxyphenylacetyl, α-n-propylphenylacetyl, 3-hydroxyphenylacetyl, 4-hydroxyphenylacetyl, 3-hydroxyphenylglycyl, 4-hydroxyphenylglycyl, 4-t-butylphenoxyacetyl, 3-phenoxypropionyl, 4-chlorophenoxyacetyl, 4-phenylbutyryl, 4-phenoxybutyryl, 5-phenylvaleryl, 5-phenoxyvaleryl, 3-bromophenoxyacetyl, α-amino-thienylacetyl, and like 7-acyl groups.

With reference to phenyl substituents, such substituent groups can occupy any available position on the benzene ring. Phenyl substituted by amino refers to phenyl substituted by one or more amino or protected amino substituents. Exemplary of such amino or protected amino-substituted groups are 3-aminophenyl, 4-aminophenyl, 2-benzyloxycarbonylaminophenyl, 3-formylaminophenyl 4-t-butyloxycarbonylaminophenyl and the like. Preferred substituents are the 3-aminophenyl and 4-aminophenyl. Phenyl substituted by $C_1$-$C_4$ lower alkyl refers to phenyl substituted by one or more methyl, ethyl, n-propyl, isopropyl, n-butyl, sec-butyl, isobutyl and t-butyl substituents. Exemplary of such lower alkyl substituted groups are 4-t-butylphenyl, 3,4-dimethylphenyl, 4-ethylphenyl, 4-isopropylphenyl, 2-methylphenyl and the like. Preferred substituents are the 3-methylphenyl, 4-methylphenyl and 3,4-dimethylphenyl. Phenyl substituted by $C_1$-$C_4$ lower alkoxy refers to phenyl substituted by one or more butoxy, ethoxy, methoxy, and propoxy substituents. Exemplary of such $C_1$-$C_4$ lower alkoxy substituted groups are 4-t-butoxyphenyl, 3-ethoxyphenyl, 2-methoxyphenyl, 3-isopropoxyphenyl, 3-methoxy-4-ethoxyphenyl, 3,4-dimethoxyphenyl and the like. Preferred substituents are the 3-methoxyphenyl, 4-methoxyphenyl and 3,4-dimethoxyphenyl. Halophenyl refers to phenyl substituted by one or more bromo, chloro or fluoro substituents. Exemplary of such halogen substituted groups are 2-bromophenyl, 3-chlorophenyl, 4-fluorophenyl and 3,4-dichlorophenyl and the like. Preferred substituents are the 3-chlorophenyl, 4-chlorophenyl and 3,4-dichlorophenyl. Phenyl substituted by hydroxy refers to phenyl substituted by one or more hydroxy or protected hydroxy substituents. Exemplary of such hydroxy or protected hydroxy-substituted groups are 3-hydroxyphenyl, 4-hydroxyphenyl, 3,4-dihydroxyphenyl, 4-t-butyloxycarbonyloxyphenyl, 2-formyloxyphenyl, 3,4-bis(benzyloxy)phenyl, 3-benzhydryloxyphenyl and the like. Preferred substituents are the 3-hydroxyphenyl, 4-hydroxyphenyl and 3,4-dihydroxyphenyl.

In the following description, amino, carboxy and hydroxy protecting groups are not exhaustively defined. The function of such groups is to protect the reactive functional groups during the preparation and then be easily removed without disrupting the remainder of the molecule. Many such protecting groups are well known in the art, and the use of other groups, not specifically listed, will be recognized as suitable.

With reference to $R_1$ in the above formula, a "carboxylic acid protecting group" refers to the organic ester or anhydride forming radicals which are commonly employed in the protection of the carboxylic acid function of the penicillin and cephalosporin antibiotics and more generally for the protection of the carboxylic acid function of amino acids and peptides. Such protecting groups are those which are stable under the conditions of the reaction but are susceptible to cleavage under acid or base hydrolytic or hydrogenolytic conditions. The specific carboxylic acid protecting groups employed are not material to the present invention so long as the foregoing criteria of stability under the reaction conditions and ease of cleavage are fulfilled. Many such groups, other than those specifically exemplified herein are well known to those skilled in the art. $R_1$, therefore, can be an ester-forming group which protects the reactive carboxyl group during the various chemical operations employed. Exemplary of such ester forming groups are t-butyl, benzyl, benzhydryl, 3,5-dimethoxybenzyl, p-methoxybenzyl, 4-methoxybenzhydryl, p-nitrobenzyl, phenacyl, p-bromophenacyl, 2,2,2-trichloroethyl, tetrahydropyranyl and the like. $R_1$ can also be the acyl radical derived from an acid and affording protection of the carboxyl group by anhydride formation. Thus, $R_1$ can be an acyl radical

wherein $R_5$ is $C_1$–$C_8$ alkyl; halo $C_1$–$C_8$ alkyl; or $C_6H_5$—Y—$(CH_2)_n$ wherein Y is oxygen, sulfur, or methylene; and $n$ is an integer from 0 to 3. The resulting anhydride is a mixed anhydride comprising the carboxyl group of the cephalosporin and the acyl radical from the acid $R_5COOH$. Examples of suitable mixed anhydrides include those derived from acetic acid, chloroacetic acid, propionic acid, valeric acid, phenylacetic acid, phenoxyacetic acid, and benzoic acid. The acetic and propionic mixed anhydrides are preferred because of their ease of preparation. Other mixed anhydrides not specifically named are equivalent and will perform the same blocking function as those named. When $R_1$ is an alkali or alkaline earth metal cation such cations as the lithium, sodium, potassium and calcium cations are representative.

The term "protected amino" as used herein refers to a primary amino group substituted by an amide or enamine forming radical which is commonly employed in the protection of the amino function of the penicillin and cephalosporin antibiotics and more generally for the protection of the amino function of amino acids and peptides. Such amino protecting or blocking groups are those which are stable under the conditions of the reaction but are susceptible to cleavage ("deblocking") under acid hydrlytic or hydrogenolytic conditions. The specific amino protecting group employed is not material so long as the foregoing criteria of stability under the reaction conditions and ease of cleavage are fulfilled. Many such groups, other than those specifically exemplified herein are well known to those in the art. Exemplary of such amide and enamine forming radicals are t-butyloxycarbonyl, benzyloxycarbonyl, substituted benzyloxycarbonyl, 2,2,2-trichloroethyloxycarbonyl, adamantyloxycarbonyl, trifluoroacetyl, chloroacetyl, ethyl acetoacetate, pentane-1,3-dione, phthaloyl, formyl and the like. It may be necessary to protect the reactive amino substituents on both the phenyl moiety and on the $\alpha$-carbon atom on the 7-acyl moiety represented by $b$ in Formula I and it will be recognized by those familiar with the art that the choice of amino protecting group may be dependent upon the type of amino group encountered.

The term "protected hydroxy" refers to a hydroxyl group substituted by an ether or ester forming radical which is commonly employed in the protection of the reactive hydroxyl function in the antibiotic and peptide arts. Such hydroxy protecting or blocking groups are those which are stable under the reaction conditions but are susceptible to cleavage (deblocking) under acid or base hydrolytic or hydrogenolytic conditions. The specific hydroxyl protecting group employed is not material so long as the foregoing criteria of stability and ease of cleavage are fulfilled. Exemplary of such hydroxyl ether and ester-forming radicals are benzyl, benzhydryl, t-butyloxycarbonyl, benzyloxycarbonyl, 2,2,2-trichloroethoxycarbonyl, formyl, ethylvinyl and the like.

Protection of co-existing amino and hydroxyl groups is possible with the same or different "blocking groups." Also, selective removal or deblocking is possible under certain conditions and is well within the skill of those versed in the art.

The compounds of the present invention are prepared by intramolecular cyclization of a 3-bromomethyl-2-(substituted ethyl)-3-cephem sulfoxide represented by formula II, upon treatment with base. In the Formula II, the substituent groups R' and $R'_1$ have the same meaning and R and $R_1$ respectively, other than hydrogen. Hereinafter R' and $R'_1$ include the respective definitions of R and $R_1$, R' and $R'_1$ being other than hydrogen and X and Y are as defined above. The base generates a carbanion at the acidic methyne, the carbon atom substituted by the electronegative groups X and Y. The carbanion displaces the bromo atom of the 3-bromomethyl group and an internal alkylation-cyclization occurs to provide the instant compounds under the reaction conditions.

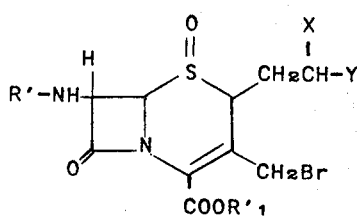

Formula II

The 3-bromomethyl-2-(substituted ethyl)-3-cephem sulfoxides represented by Formula II, the starting materials for the present invention, are prepared by the bromination of the corresponding 3-methyl-2-(substituted ethyl)-3-cephem sulfoxides. The 3-methyl-2-(substituted ethyl)-3-cephem sulfoxides are prepared via a Michael type addition to the C-2 exomethylene double bond by reacting a 3-methyl-2-methylene-3-cephem sulfoxide [prepared by the method of Wright, et al., *J. Med. Chem.*, 14, 420 (1971)], represented by the Formula III, with at least a molar equivalent of a methylene carbanion of the formula, —CHXY, generated in a substantially anhydrous inert solvent from an active methylene component of the formula, XCH$_2$Y, in the presence of a base at a temperature between −40°C. and 20°C.

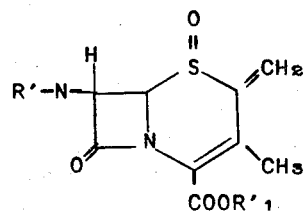

Formula III

The active methylene components which are suitable for the Michael addition are acetonitrile, acetylacetone (2,4-pentanedione), acetoacetic esters, benzoylacetone, benzoylacetic esters, cyanoacetic esters, cyanoacetone, cyanoacetophenone, dibenzoylmethane (1,-3-diphenyl-1,3-propanedione), malonic esters, malonitrile, nitromethane and the like. Any base strong enough to generate a methylene carbanion can be employed. Examples of preferred bases include n-butyl lithium, lithium diisopropylamide, sodium hydride, sodium hydroxide, sodium methoxide, benzyltrimethylammonium hydroxide and the like. Solvents which may be employed to prepare the Michael adducts are any commonly used reaction solvents which are unreactive with the starting materials and products, and are preferably those which do not undergo carbanionic reactions. In general, any solvent in which the starting material is at least partially soluble at the addition temperature and which is unreactive with the reaction mixture constituents can be employed. Exemplary of the solvents which are employed are dimethylacetamide (DMAC), dimethylformamide (DMF), dichloroethane, tetrahydrofuran (THF), dioxane and other ethers, for example, the dimethyl ether of ethyleneglycol.

The 3-methyl group of such "Michael adducts" is brominated with N-bromosuccinimide in an inert solvent, preferably a chlorinated hydrocarbon solvent such as carbon tetrachloride or dichloroethane, using preferably azobisisobutyronitrile (AIBN) as a catalyst for the bromination in the temperature range of about 70°C. to 90°C. for at least 8 hours with or without the use of ultraviolet light. The product, a 3-bromomethyl-2-(substituted ethyl)-3-cephem sulfoxide compound represented by Formula II, is recovered by evaporation of the solvent and purified by chromatography.

This invention also concerns a process for the preparation of the tricyclic cephalosporins represented by Formula I, wherein R and R$_1$ are other than hydrogen, q is 1 and Q is

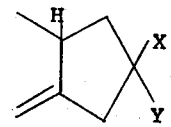

which comprises reacting in a substantially anhydrous inert solvent at a temperature between −40°C. and 20°C., a compound represented by the Formula II with a molar equivalent of base for a period of about 10 minutes to an hour. The reaction mixture is neutralized with acid and the tricyclic cephalosporin product is conveniently recovered by evaporation of the solvent. The product can be purified by chromatography or other suitable techniques. As in the preparation of the Michael adducts, bases strong enough to generate a methyne carbanion at the carbon atom substituted by the electronegative groups X and Y, such as n-butyl lithium, lithium diisopropylamide, sodium hydride, sodium hydroxide, sodium methoxide, benzyltrimethylammonium hydroxide and the like are employed. Solvents which may be employed in the process are any commonly used reaction solvents which are unreactive with the starting materials and products and are preferably those which do not undergo carbanionic reactions. Exemplary of the solvents employed are DMAC, DMF, dichloroethane, dioxane, THF and the dimethyl ether of ethyleneglycol. The preferred solvents are the amide solvents, DMAC and DMF.

In addition, the instant invention concerns a process for the preparation of the 3a,4,6a,7-tetradehydrocyclopenta[b]cepham compounds represented by the Formula I, wherein q is 0 and Q is

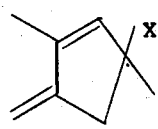

which comprises reacting a 6a,7-didehydrocyclopenta[b]cepham compound represented by the Formula I, wherein R and R$_1$ are other than hydrogen, q is 0 and Q is

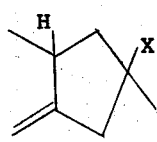

with a molar equivalent of chlorine gas in a substantially anhydrous inert solvent, preferably a mixture of chlorinated hydrocarbons such as carbon tetrachloride and dichloroethane, at a temperature from about −40°C. to about 50°C. for about 15 minutes to an hour.

The tricyclicdiene product is recovered by evaporating the solvent and purified by conventional methods.

Alternatively, the 3a,4,6a,7-tetradehydrocyclopenta[b]cepham compounds can be prepared under reducing conditions by reacting a 3a-bromo-6a,7-didehydrocyclopenta[b]cepham sulfoxide (Formula I, Z is Br) with phosphorous trichloride, preferably in DMF for about 15 minutes to an hour at room temperature, whereby dehydrobromination and sulfoxide reduction are accomplished concomitantly. The reaction mixture is extracted to recover the tricyclicdiene product.

The 3a-bromo-6a,7-didehydrocyclopenta[b]cepham sulfoxides are prepared by reacting a 6a,7-didehydrocyclopenta[b]cepham sulfoxide with at least a molar equivalent of N-bromosuccinimide in a chlorinated hydrocarbon solvent, preferably carbon tetrachloride, and a catalytic amount of azobisisobutyronitrile. The reaction time may vary depending upon the boiling temperature of the solvent employed. Four to 5 hours is sufficient with dichloroethane (b.p. 83.8°C.) whereas 5 to 10 hours is required with methylene chloride (b.p. 40.8°C.). The use of a sun lamp is advantageous in reducing the reaction time. The 3a-bromo product is recovered by evaporation of the solvent and is purified by chromatography.

In a preferred embodiment of the preparation of a 3-bromomethyl compound represented by the Formula II, 2,2,2-trichloroethyl 2-[2,2-bis(2,2,2-trichloroethoxycarbonyl)ethyl]-3-methyl-7-phenoxyacetamido-3-cephem-4-carboxylate sulfoxide, a molar equivalent of N-bromosuccinimide and a catalytic amount of azobisisobutyronitrile (AIBN) are refluxed in dichloroethane under nitrogen for about 8 hours under a sun lamp. The mixture is evaporated to dryness in vacuo and the residue is chromatographed to provide 2,2,2-trichloroethyl 3-bromomethyl-2-[2,2-bis(2,2,2-trichloroethoxycarbonyl)ethyl]-7-phenoxyacetamido-3-cephem-4-carboxylate sulfoxide.

In a preferred embodiment of the cyclization feature of this invention, a solution of 2,2,2-trichloroethyl 3-bromomethyl-2-(2,2-dimethoxycarbonylethyl)-7-phenoxyacetamido-3-cepham-4-carboxylate-3-cephem-4-carboxylate sulfoxide in DMF is reacted with one equivalent of sodium hydride at a temperature of about −20°C. The reaction is continued for an hour at about 0°C. and then the reaction mixture is neutralized by the addition of glacial acetic acid. The reaction mixture is extracted with ethyl acetate and the extract is washed and dried. The ethyl acetate is evaporated in vacuo and the residue is chromatographed to provide 2,2,2-trichloroethyl 5,5-dicarbomethoxy-6a,7-didehydro-2-phenoxyacetamidocyclopenta[b]cepham-7-carboxylate sulfoxide.

Additional aspects of this invention are illustrated by the following examples of preferred embodiments.

As an example of the preparation of a tricyclic cephalosporin compound represented by the Formula I, a solution of 2,2,2-trichloroethyl 3-bromomethyl-2-[2,2-bis-(2,2,2-trichloroethoxycarbonyl)ethyl]-7-phenoxyacetamido-3-cephem-4-carboxylate sulfoxide in DMF is reacted with one equivalent of sodium hydride at a temperature of about −20°C. After about 1 hour at about 0°C., the reaction mixture is neutralized with dilute hydrochloric acid. The reaction mixture is extracted with ethyl acetate and the extract is washed and dried. The ethyl acetate is evaporated in vacuo and the residue is chromatographed to provide 2,2,2-trichloroethyl 6a,7-didehydro-2-phenoxyacetamido-5,5-bis(2,2,2-trichloroethoxycarbonyl)cyclopenta[b]cepham-7-carboxylate sulfoxide.

In another example of the preparation of a tricyclic cephalosporin, 2,2,2-trichloroethyl 3-bromomethyl-2-(2,2-dimethoxycarbonylethyl)-7-(O-formylmandelamido)-3-cepham-4-carboxylate sulfoxide in DMF is reacted with one equivalent of sodium hydride at a temperature of about −20°C. The reaction is continued for an hour at about 0°C. and then the reaction mixture is neutralized with dilute hydrochloric acid. The reaction mixture is extracted with ethyl acetate and the extract is washed and dried. The ethyl acetate is evaporated in vacuo and the residue is chromatographed to provide 2,2,2-trichloroethyl 5,5-dicarbomethoxy-,7-didehydro-2-(O-formylmandelamido)cyclopenta[b]cepham-7-carboxylate sulfoxide.

In a further preferred embodiment of the preparation of a tricyclic cephalosporin, 2,2,2-trichloroethyl 3-bromomethyl-7-(N-t-butyloxycarbonylphenylglycylamido)-2-[2,2-(2,2,2-trichloroethoxycarbonyl)ethyl]-3-cephem-4-carboxylate sulfoxide in DMF is reacted with one equivalent of sodium hydride at a temperature of about −20°C. The reaction is contined for an hour at about 0°C. and then the reaction mixture is neutralized with dilute hydrochloric acid. The reaction mixture is extracted with ethyl acetate and the extract is washed and dried. The ethyl acetate is evaporated in vacuo and the residue is chromatographed to provide 2,2,2-trichloroethyl 2-(N-t-butyloxycarbonylphenylglycylamido)-6a, 7-didehydro-5,5-bis(2,2,2-trichloroethoxycarbonyl)cyclopenta[b]cepham-7-carboxylate sulfoxide.

As an example of the process for the preparation of tricyclicdiene compound represented by the Formula I, where q is o and Q is

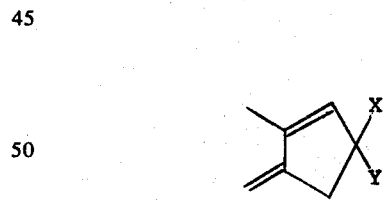

a solution of 2,2,2-trichloroethyl 6a,7-didehydro-2-[2(2-thienyl)acetamido]-5,5-bis(2,2,2-trichloroethoxycarbonyl)cyclopenta[b]cepham-7-carboxylate, in a mixture of dichloroethane and carbon tetrachloride, is reacted with a molar equivalent of chlorine gas at a temperature of about 50°C for about 30 minutes. The reaction mixture is evaporated to dryness in vacuo. The residue is chromatographed to provide 2,2,2-trichloroethyl 3a, 4, 6a, 7-tetradehydro-2-[2(thienyl)acetamido]-5,5-bis(2,2,2-trichloroethoxycarbonyl)cyclopenta[b]cepham-7-carboxylate.

Exemplary of the preparation of a 3a, 4, 6a, 7-tetradehydro compound represented by the Formula I, a solution of 2,2,2-trichloroethyl 6a,7-didehydro-2-phenoxyacetamido-5,5-bis(2,2,2-trichloroethoxycarbonyl)cyclopenta[b]cepham-7-carboxylate, in a mixture of dichloroethane and carbon tetrachloride, is reacted with a molar equivalent of chlorine gas at about 50°C for about 30 minutes. The reaction mixture is evaporated in vacuo and the residue chromatographed to provide 2,2,2-trichloroethyl 3a,4,6a,7-tetradehydro-2-phenoxyacetamido-5,5-bis(2,2,2-trichloroethoxycarbonyl)cyclopenta[b]cepham-7-carboxylate.

The 2-amino-6a,7-didehydrocyclopenta[b]cepham compounds of Formula I, wherein R and $R_1$ are hydrogen, are prepared from a compound represented by Formula I, wherein R is an acyl group and $q$ is 0, by cleavage of the 2-carboxamido group. The 2-carboxamido group can be cleaved by blocking the carboxyl of the tricyclic cephalosporin acid by conversion to a mixed anhydride as described by Chauvette et al, J. Antibiot., 248 (1972), treating the blocked cephalosporin with a halogenating agent to convert the amido group to an imino halide, treating the imino halide with an alcohol to obtain an imino ether, and hydrolyzing the imino ether to give a free 2-amino group with concomitant removal of the acid-blocking group.

The tricyclic cephalosporin compounds provided by this invention wherein $R_1$ is a group other than hydrogen are converted to the antibiotic tricyclic cephalosporin acids according to methods well known to those skilled in the art. The tricyclic cephalosporin sulfoxide esters are reduced via a trivalent phosphorus compound as described in U.S. Pat. No. 3,641,041, for example. The reduction products, the corresponding sulfide esters, are converted to the corresponding tricyclic carboxylic acids by cleavage of the ester groups, for example with zinc dust in acetic acid as described by Woodward et al., J. Amer. Chem. Soc. 88, 852 (1966), or with trifluoroacetic acid in anisole or by hydrogenolysis with palladium on carbon as described in British Patent 1,041,985 to provide the compounds of Formula I, wherein $R_1$ is hydrogen and $q$ is 0.

In a similar manner, the tricyclicdiene cephalosporins are converted to antibiotic tricyclicdiene cephalosporin acids.

The following reaction scheme outlines the procedures employed in this invention and illustrates further the usefulness of the invention for converting the 3-methyl-3-cephem Michael adducts into antibiotic tricyclic cephalosporins via the intermediates described.

Reaction Scheme

Tricyclic Cephalosporins

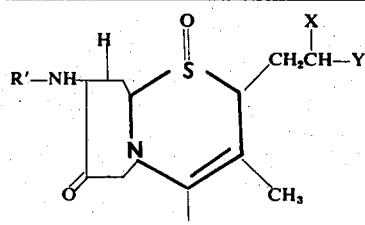

-Continued

Reaction Scheme

Tricyclic Cephalosporins

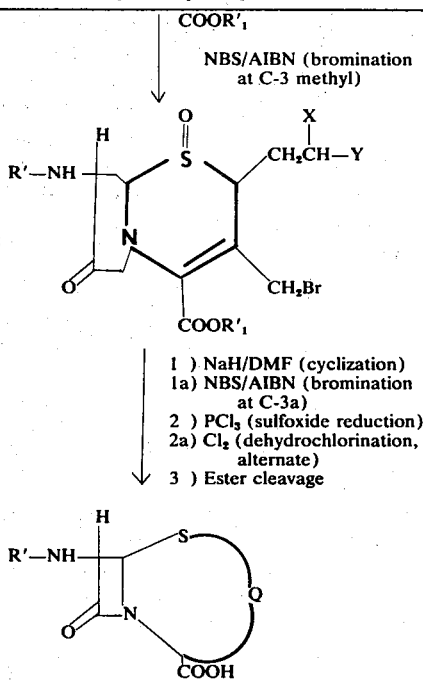

1 ) NaH/DMF (cyclization)
1a) NBS/AIBN (bromination at C-3a)
2 ) PCl$_3$ (sulfoxide reduction)
2a) Cl$_2$ (dehydrochlorination, alternate)
3 ) Ester cleavage 1a and 2a are alternate routes for the synthesis of the tricyclicdiene cephalosporins.

The instant tricyclic cephalosporin acids inhibit the growth of gram-positive organisms at concentrations as low as 1 milligram per milliliter in the standard agar dilution test as measured by zone inhibition against *Staphylococcus aureus* (SA), *Bacillus subtilis* (X12), *Sarcina lutea* (X186) and *Mycobacterium avium* (X85). Typical test results of such tricyclic cephalosporin acids expressed as organism/zone inhibition (diameter, mm) are the following: 5,5-dicarbomethoxy-6a,7-didehydro-2-phenoxyacetamidocyclopenta[b]cepham-7-carboxylic acid, SA/26, X12/24 and X186/23; 5,5-dicarboxy-6a,7-didehydro-7-phenoxyacetamidocyclopenta[b]cepham-7-carboxylic acid, SA/15, X/17 and X186/10; 5,5-dicarboxy-3a,4,6a,7-tetradehydro-2-phenoxyacetamidocyclopenta[b]cepham-7-carboxylic acid, SA/21, X12/21 and X186/13.

The tricyclic cephalosporin acids are useful in combatting gram-positive infections in warm blooded animals. When administered parenterally at a non-toxic dose between about 50 and 500 mg/kg of body weight, the compounds of the invention are effective in controlling bacterial infections in warm-blooded mammals. The compounds can be administered as single dose or as multiple daily doses, dependent upon such conditions as the general health of the host and the type and the severity of the infection. A compound of the invention can be administered as a single daily dose, which regimen may continue until the desired therapeutic result is achieved. Alternatively, a treatment employing multiple doses, for example, 3 or 4 doses administered daily, may be used with a particular host.

The tricyclic cephalosporin acids exhibit inhibitory action against the growth of microbial organisms including gram-positive bacteria which are pathogenic to animal and plant life. Hence these antibiotics are also useful, when incorporated into disinfectant solutions, for sterilizing medical instruments and food utensils, for example.

Illustrative of the 6a,7-didehydrocyclopenta[b]-cepham carboxylic acids and esters which are provided by this invention are the following:

benzyl 6a,7-didehydro-5,5-diacetyl-2-formamidocyclopenta[b]cepham-7-carboxylate sulfoxide benzyhydryl 2-acetamido-5-acetyl-5-benzoyl-6a,7-didehydrocyclopenta[b]cepham-7-carboxylate sulfoxide 3,5-dimethoxybenzyl 5-acetyl-5-carbethoxy-6a,7-didehydro-2-octanamidocyclopenta[b]cepham-7-carboxylate sulfoxide p-nitrobenzyl 5-acetyl-6a,7-didehydro-2-phenylacetamido-5-(2,2,2-trichloroethoxycarbonyl)cyclopenta[b]cepham-7-carboxylate sulfoxide 2,2,2-trichloroethyl 5-acetyl-5-cyano-6a,7-didehydro-2-[(4-methoxyphenyl)acetamido]cyclopenta[b]cepham-7-carboxylate sulfoxide benzhydryl 5-acetyl-5-carboxyl-6a,7-didehydro-2-[(3-hydroxyphenyl)acetamido]cyclopenta[b]cepham-7-carboxylate sulfoxide benzyl 5,5-dibenzoyl-6a,7-didehydro-2[(4-methylphenyl)acetamido]cyclopenta[b]cepham-7-carboxylate benzhydryl 5-benzoyl-5-carbomethoxy-6a,7-didehydro-2-(α-methylphenylacetamido)cyclopenta[b]cepham-7-carboxylate t-butyl 5-benzoyl-5-carbethoxy-6a,7-didehydro-2-(α,α-dimethylphenylacetamido)cyclopenta[b]cepham-7-carboxylate 3,5-dimethoxybenzyl 5-benzoyl-6a,7-didehydro-2-(α-n-propylphenylacetamido)-5-(2,2,2-trichloroethoxycarbonyl)cyclopenta[b]cepham-7-carboxylate p-nitrobenzyl 5-benzoyl-5-cyano-6a,7-didehydro-2-(4-phenylbutyramido)cyclopenta[b]cepham-7-carboxylate 2,2,2-trichloroethyl 5-benzoyl-5-carboxy-6a,7-didehydro-2-(5-phenylvaleramido)cyclopenta[b]cepham-7-carboxylate acetic 5,5-dicarbomethoxy-6a,7-didehydro-2-phenoxyacetamidocyclopenta[b]cepham-7-carboxylic anhydride t-butyl 5-acetyl-5-carbomethoxy-6a,7-didehydro-2-pivalamidocyclopenta[b]cepham-7-carboxylate sulfoxide propionic 5-carbomethoxy-5-cyano-6a,7-didehydro-2-(4-t-butylphenoxyacetamido)cyclopenta[b]cepham-7-carboxylate anhydride 5-carbethoxy-5-carbomethoxy-6a,7-didehydro-2-(3-phenoxypropionamido)cyclopenta[b]cepham-7-carboxylic acid 5-carbomethoxy-2-(4-chlorophenoxyacetamido)-6a,7-didehydro-5-(2,2,2-trichloroethoxycarbonyl)cyclopenta[b]cepham-7-carboxylic acid 5-carbomethoxy-5-carboxy-2-(4-chlorophenoxyacetamido)-6a,7-didehydrocyclopenta[b]cepham-7-carboxylic acid 5,5-dicarbethoxy-6a,7-didehydro-2-(4-phenoxybutyramido)cyclopenta[b]cepham-7-carboxylic acid 5-carbethoxy-6a,7-didehydro-2-(5-phenoxyvaleramido)-5-(2,2,2-trichloroethoxycarbonyl)cyclopenta[b]cepham-7-carboxylic acid sodium 5-carbethoxy-5-cyano-6a,7didehydro-2-[(2-thienyl)acetamido]cyclopenta[b]cepham-7-carboxylate 5-carbethoxy-5-carboxy-3a,4,6a,7-tetradehydro-2-[(2-thienyl)acetamido]cyclopenta[b]cepham-7-carboxylic acid lithium 5,5-dicyano-3a,4,6a,7-tetradehydro-2-[(2-furyl)acetamido]cyclopenta[b]cepham-7-carboxylate 2-[α-amino(2-thienyl)acetamido]-5-cyano-6a,7-didehydro-5-(2,2,2-trichloroethoxycarbonyl)cyclopenta[b]cepham-7-carboxylic acid 6a,7-didehydro-2-phenylglycylamido-5,5-bis(2,2,2-trichloroethoxycarbonyl)cyclopenta[b]cepham-7-carboxylic acid 5-carboxy-5-cyano-6a,7-didehydro-2-mandelamidocyclopenta[b]cepham-7-carboxylic acid 2-(N-benzyloxycarbonylphenylglycylamido)-5-carboxy-6a,7-didehydro-5-(2,2,2-trichloroethoxycarbonyl)cyclopenta[b]cepham-7-carboxylic acid 5,5-dicarboxy-3a,4,6a,7-tetradehydro-2-phenylglycylamidocyclopenta[b]cepham-7-carboxylic acid potassium 5,5-dicarbomethoxy-3a,4,6a,7-tetradehydro-2-[(2-furyl)acetamido]cyclopenta[b]cepham-7-carboxylate The cephalosporin acids of this invention readily form salts such as the lithium, sodium and potassium salts by the reaction of the free antibiotic acid in a suitable solvent with an alkali metal carbonate or bicarbonate. In similar manner the alkaline earth salts such as the calcium or barium salts are prepared.

The compounds of this invention, represented by the Formula I, which are esters or which contain a protected hydroxy or a protected amino function do not possess antibiotic activity to any appreciable degree. However, by removal of the hydroxy and amino function protecting groups, by employing well known methods and procedures, the antibiotic compounds of the invention are obtained where in the Formula I, $R_1$ is hydrogen and a free amino or free hydroxy group is present.

In the following illustrative examples, infrared absorption spectrum and nuclear magnetic resonance spectrum are abbreviated IR and NMR respectively. Only the significant IR absorption attributable to the carbonyl function of the beta-lactam ring is given. Likewise, the pertinent peaks observed in the NMR spectra are listed. The nuclear magnetic resonance spectra were obtained on a Varian Associated T-60 Spectrometer with tetramethylsilane as the reference standard. The chemical shifts are expressed in δvalues in parts per million (ppm) and coupling constants (J) are expressed as Hz in cycles per second (cps).

The following standard abbreviations are employed for the observed peaks in the NMR spectra: d (doublet), m (multiplet), p (proton) and s (singlet).

(I) Preparation of 3-Methyl-3-Cephem Michael Adducts

EXAMPLE 1

Preparation of 2,2,2-trichloroethyl 7-acetamido-2-(2,2-dicarbomethoxyethyl)-3-methyl-3-cephem-4-carboxylate sulfoxide One equivalent of sodium hydride, 0.153 g. (3.18 millimole) as a 50% mineral oil dispersion was added under nitrogen to 0.420 g. (3.18 millimole) of dimethylmalonate in 50 ml. of DMF cooled to −40°C. in an acetone dry-ice bath. The reaction mixture was stirred while the reaction temperature was allowed to warm to about 5°C. for about 10 minutes to form the methylene carbanion. Trichloroethyl 7-acetamido-2-methylene-3-methyl-4-carboxylate sulfoxide, 1.248 g. (3.0 millimole), in 50 ml. of DMF was added dropwise to the cold (−40°C.) reaction mixture. The reaction was continued for 30 minutes at −30° to −15°C. during which time the reaction mixture became brown. Five milliliters of 1N hydrochloric acid was added dropwise to the reaction which was allowed to warm to 0°C. and the brown color of the reaction changed to light yellow. The reaction was taken up in ethyl acetate. The ethyl acetate phase was washed successively thrice with dilute sodium chloride solution, twice with water and saturated sodium chloride solution. The ethyl acetate solution was dried ($Na_2SO_4$) and evaporated in vacuo to a residue which was chromatographed on silica gel. The residue was eluted with benzene-ethyl acetate gradient to yield 1.69 g. of trichloroethyl 7-acetamido-2-(2,2-dicarbomethoxycarbonylethyl)-3-methyl-3-cephem-4-carboxylate sulfoxide which was characterized by physical data.

Mass spectrum, 528(m/e). The NMR in deuterochloroform showed bands at 2.14($CH_3CON$,S, 3p); 2.34(3-$CH_3$,S, 3p); 1.3–2.9 (2-methylene, m, 2p); 3.5–4.0 (2-methyne + adduct methyne, m, 2p); 3.84($CH_3CO_2$, s, 3p); 3.88($CH_3CO_2s$, 3p); 4.7(H-6, d, J=4.0 Hz, 1p); 4.98($Cl_3CCH_2CO_2$, AB, 2p); 6.11(H-7, q, J=4.0, 9.0 Hz, 1p); 7.01 δ(-NH, d, J=9.0, 1p).

EXAMPLE 2

Preparation of 2,2,2-trichloroethyl 3-methyl-2-(2,2-dicyanoethyl)-7-phenoxyacetamido-3-cephem-4-carboxylate sulfoxide Malononitrile, 140.5 mg. (2.12 millimole), was dissolved in 25 ml. of DMF under nitrogen with stirring and the solution was cooled to −10°C. One equivalent, 101 mg. (2.12 millimole) of sodium hydride, as a 50% mineral oil dispersion, was added in one lot and the reaction was continued at 0°C. for about 10 minutes to permit carbanion formation. The reaction mixture was cooled to −30°C. and 1016 mg. (2.00 millimole) of 2,2,2-trichloroethyl 3-methyl-2-methylene-7- phenoxyacetamido-3-cephem-4-carboxylate sulfoxide in 20 ml. of DMF was added dropwise. The reaction was continued at about −20°C. for 30 minutes while the color of the reaction changed to brown. Five milliliters of 1N hydrochloric acid was added dropwise while the temperature rose to 0°C. and the color of the reaction changed to light yellow. The reaction mixture was taken up in ethyl acetate. The ethyl acetate solution was washed successively thrice with water, dilute hydrochloric acid and sodium chloride solution and finally with sodium chloride solution. The ethyl acetate was dried ($Na_2SO_4$) and evaporated in vacuo to a residue. The residue was chromatographed on silica gel using benzene and benzene-ethyl acetate as gradient to yield 919 mg. of 2,2,2-trichloroethyl 3-methyl-2-(2,2-dicyanoethyl)-7-phenoxyacetamido-3-cephem-4-carboxylate sulfoxide and 300 mg. of a mixture containing product and starting material. The malononitrile adduct product was characterized by physical data.

The NMR in deuterochloroform showed bands at 1.9–2.5 (adduct methylene, m, 2p); 2.30 (3-$CH_3$, s, 3p); 3.8 (2-methyne, m, 1p); 4.2–4.5 (adduct methyne, m, 1p); 4.60 ($PhOCH_2$, 5, 2p); 4.80 (H–6, d, J=4.0 Hz, 1p); 5.06 ($CCl_3CH_2CO_2$, s, 2p); 6.18 (H-7, q, J=4.0, 10.0 Hz, 1p); 7.8 δ(NH,d, J=10.0 Hz, 1p).

EXAMPLE 3

Preparation of 2,2,2-trichloroethyl 2-[2,2-bis(2,2,2-trichloroethoxycarbonyl)ethyl]-3-methyl-7-phenoxyacetamido-3-cephem-4-carboxylate sulfoxide A. Bis(2,2,2-trichloroethyl) malonate.

One equivalent of malonic acid, 62.44 g. (0.6 mole), and 179.3 g. (1.2 mole) of 2,2,2-trichloroethanol were dissolved in one liter of benzene followed by the addition of 8 ml. of concentrated sulfuric acid. The reaction mixture was refluxed for 21 hours using a Dean-Stark trap to collect the azeotrope distillate. The reaction mixture was evaporated in vacuo and the residue was taken up in ethyl acetate. The ethyl acetate phase was washed successively thrice with sodium bicarbonate solution, dilute sodium chloride solution, and saturated sodium chloride solution, and dried ($Na_2SO_4$). The ethyl acetate was evaporated in vacuo to a residual oil. The oil was distilled and the fraction, bp 132°–142°/0.9 mm, was collected.

B. 2,2,2-Trichloroethyl 2-[2,2-bis(2,2,2-trichloroethoxycarboxyl)ethyl]-3-methyl-7-phenoxyacetamido-3-cephem-4-carboxylate sulfoxide.

Bis(2,2,2-trichloroethyl)malonate, 24.2 g. (66 millimole), was dissolved in 600 ml. of DMF under nitrogen and the reaction mixture was cooled to −5°C. One equivalent of sodium hydride, 3.20 g. (66 millimole), as a 50% mineral oil dispersion, was added and allowed to react with stirring for one half hour to form the anion. The reaction was cooled to −60°C. and 30.46 g. (60 millimole) of 2,2,2-trichloroethyl 3-methyl-2-methylene-7-phenoxyacetamido-3-cephem-4-carboxylate sulfoxide dissolved in 500 ml. of DMF was added dropwise to the cold reaction mixture. The reaction was continued for one half hour at about −30°C. The reaction mixture was cooled to −10°C. and 100 ml. of 1N hydrochloric acid was added dropwise resulting in a color change from brown to yellow. The reaction mixture was taken up in ethyl acetate and washed successively with dilute hydrochloric acid, water and sodium chloride solution four times. The ethyl acetate phase was then washed with water and saturated sodium chloride solution and was dried ($Na_2SO_4$). The ethyl acetate was evaporated in vacuo to a froth residue. The residue was chromatographed on silica gel using benzene-ethyl acetate (1:1) as eluent to yield 50.4 g. of 2,2,2-trichloroethyl 2-[2,2-bis(2,2,2-trichloroethoxycarbonyl)ethyl]-3-methyl-7-phenoxyacetamido-3-cephem-4-carboxylate sulfoxide which was characterized by physical data.

The NMR in deuterochloroform showed bands at 1.5–3.1 (adduct methylene, m, 2p); 2.27 (3-$CH_3$, s, 3p); 3.5–4.2 (2-methyne + adduct methyne, m, 2p); 4.56 ($PhOCH_2$, s, 2p); 4.70 (H-6, d, J=4.0 Hz, 1p); 4.85, 4.90 (two $CCl_3CH_2CO_2$, two s, 4p); 5.00 (4-$CCl_3CH_2CO_2$, s, 2p); 6.20 (H-7, q, J=4.0, 10.0 Hz, 1p); 7.90 δ(NH, d, J=10.0 Hz, 1p).

(II) Preparation of Tricyclic Cephalosporins

EXAMPLE 4

Preparation of 2,2,2-Trichloroethyl 7-acetamido-3-bromomethyl-2-(2,2-dicarbomethoxyethyl)-3-cephem-4-carboxylate sulfoxide One equivalent of 2,2,2-trichloroethyl 7-acetamido-2-(2,2-dicarbomethoxyethyl)-3-methyl-4-carboxylate sulfoxide, 1.64 g. (3.0 millimole), 640 mg. (3,60 millimole) of N-bromosuccinimide (NBS) and 61 mg. (0.45 millimole) of azobisisobutyronitrile were combined in 50 ml. of carbon tetrachloride. The stirred reaction mixture was refluxed at 77°C. for about 9 hours. The reaction mixture was evaporated in vacuo and chromatographed on silica gel using benzene (500 ml.) and benzene-ethyl acetate (1:1, 500 ml.) gradient to yield 584 mg. of 2,2,2-trichloroethyl 7-acetamido-3-bromomethyl-2-(2,2-dicarbomethoxyethyl)-4-carboxylate sulfoxide, containing a trace of NBS. The product was characterized by physical data. NMR in deuterochloroform showed bands at 1.4–2.8 (2-methylene, m, 2p); 2.12 ($CH_3CON$, s, 3p); 3.8–4.2 (2-methyne + adduct methyne, m, 2p); 3.80 ($CH_3CO_2$, s, 3p); 3.90 ($CH_3CO_2$, s, 3p) 4.55 ($CH_2Br$, s, 2p); 4.86 (H-6, d, J=4.0 Hz, 1p); 4.88, 5.12 ($Cl_3CCH_2CO_2$, A, B, J=12.0 Hz, 2p); 6.15 (H-7, q, J=4.0, 9.0 Hz, 1p); 7.25 δ(NH, d, J=9.0 Hz, 1p).

EXAMPLE 5

Preparation of 2-acetamido-5,5-dicarbomethoxy-6a,7-didehydrocyclopenta[b]cepham-7-carboxylate sulfoxide One equivalent, 584 mg. (0.935 millimole), of 2,2,2-trichloroethyl 7-acetamido-3-bromomethyl-2-(dimethyl methylenemalonate)-3-cephem-4-carboxylate sulfoxide was dissolved in 50 ml. of DMF under nitrogen at 0°C. Sodium hydride, 45 mg. (0.935 millimole), as a 50% mineral oil dispersion, was added to the cold reaction mixture and stirred for about one hour. The reaction mixture was cooled to about −5°C. and 25 ml. of 1N hydrochloric acid was added dropwise by means of a capillary pipette. The reaction mixture was allowed to warm up after the acid addition was completed and the color of the reaction mixture changed from brown to light yellow. The reaction mixture was taken up in ethyl acetate and washed successively thrice with dilute sodium chloride solution, saturated sodium chloride solution and dried ($Na_2SO_4$). The ethyl acetate solution was evaporated in vacuo of a residue. The residue was chromatographed on silica gel using benzene (500 ml.) and benzene-ethyl acetate (1:1, 500 ml.) gradient to yield 312 mg. of 2,2,2-trichloroethyl 2-acetamido-5,5-dicarbomethoxy-6a,7-didehydrocyclopenta[b]cepham-7-carboxylate sulfoxide which was characterized by physical data. Mass spectrum showed a mass ion of 544 and a strong peak at 526 m/e).

NMR in deuterochloroform showed bands at 2.07 ($CH_3CONH$, s, 3p); 2.2–3.1 (4-methylene, ABX(m), 2p); 3.59 (6-methylene, s, 2p); 3.78 (5,5-$CH_3CO_2$+3a-methyne, s, 7p); 4.60 (H-2a, d(shoulder), J=4.0 Hz, 1p); 4.95 $Cl_3CCH_2$, s, 2p); 6.0 (H-2, q, J=4.0, 9.0 Hz, 1p); 6.89 δ(NH, d, J=9.0 Hz, 1p).

EXAMPLE 6

Preparation of 2,2,2-Trichloroethyl 3-bromomethyl-2-(2,2-dicarbomethoxyethyl)-7-phenoxyacetamido-3-cephem-4-carboxylate sulfoxide One equivalent of 2,2,2-trichloroethyl-2-(2,2-dicarbomethoxyethyl)-3-methyl-7-phenoxyacetamido-3-cephem-4-carboxylate sulfoxide, 1202 mg. (1.88 millimole), 400 mg. (2.23 millimole) of N-bromosuccinimide and 36 mg. (0.267 millimole) of azobisisobutyronitrile (AIBN) were combined in 50 ml. of carbon tetrachloride. The reaction mixture was refluxed at 77°C. for 9 hours and then evaporated to dryness in vacuo. The residue was chromatographed on silica gel using benzene-ethyl acetate (1:1) as eluant to yield 1.02 g. of 1.02 g. of 2,2,2-trichloromethyl 3-bromomethyl-2-(2,2-dicarbomethoxyethyl)-7-phenoxyacetamido-3-cephem-4-carboxylate sulfoxide which was characterized by physical data.

IR($CHCl_3$): 1810 $cm^{-1}$ (β-lactam)

The NMR in deuterochloroform showed bands at 1.2–2.8 (adduct methylene, m, 2p); 3.5–4.0 (2-methyne + adduct methyne, m, 2p); 3.75, 3.82 (two $CH_3CO_2$, two s, 6p); 4.4–4.7 ($CH_2Br$, $PhOCH_2$, H-6, m, 5p); 4.85, 5.05 ($CCl_3CH_2CO_2$, AB, J=11.0 Hz); 6.20 (H-7, q, J=4.0, 11.0 Hz, 1p); 7.85 δ(NH, d, J=11.0 Hz, 1p).

The distinguishing features of the product NMR are the loss of the 3-$CH_3$ band and the appearance of an AB pattern of the 3-$CH_2Br$ masked by the H-6 proton and the phenoxymethyl protons (4.4–4.7 δ).

EXAMPLE 7

Preparation of 2,2,2-trichloroethyl 5,5-dicarbomethoxy-6a, 7-didehydro-2-phenoxyacetamidocyclopenta[b]cephem-7-carboxylate sulfoxide One equivalent of 2,2,2-trichloroethyl 3-bromomethyl-2-(2,2-dicarbomethoxyethyl)-7-phenoxyacetamido-3-cephem-4-carboxylate sulfoxide, 174 mg. (0.243 millimole), was dissolved in 50 ml. of DMF and the solution was cooled to −20°C. under nitrogen. Twelve milligrams (0.245 millimole) of sodium hydride as a 50% mineral oil dispersion was added in one lot to the cold reaction mixture. The reaction was continued at 0°C. for 1 hour. Several milliliters of glacial acetic acid were added to the reaction mixture. The reaction mixture was extracted with ethyl acetate. The ethyl acetate phase was washed thrice with dilute sodium chloride solution, saturated sodium chloride solution, and dried ($Na_2SO_4$). The ethyl acetate was evaporated in vacuo to a residue. The residue was chromatographed on silica gel using benzene-ethyl acetate (1:1) gradient to yield 93 mg. of 2,2,2-trichloroethyl 5,5-dicarbomethoxy-6a,7-didehydro-2-phenoxyacetamidocyclopenta[b]cepham-7-carboxylate sulfoxide which was characterized by physical data.
IR(CHCl$_3$): 1807 cm$^{-1}$ ($\beta$-lactam)
uv max (ETOH), 272 nm ($\epsilon$ 6600)
The NMR in deuterochloroform showed bands at 2.2–3.1 (4-methylene, ABX, 2p); 3.60 (6-methylene, s(broad), 2p); 3.76 (3a-methyne + two 5,5-CH$_3$CO$_2$, s, 7p); 4.58–4.66 (PhOCH$_2$ + H-2a, m, 3p); 4.95 (CCl$_3$CH$_2$CO$_2$, s, 2p); 6.10 (H-2, q, J = 4.0, 11.0 Hz, 1p); 7.80 $\delta$(NH, d, J=11.0 Hz, 1p).

EXAMPLE 8

Preparation of 2,2,2-trichloroethyl 5,5-dicarbomethoxy-6a,7-didehydro-7-phenoxyacetamidocyclopenta[b]cepham-4-carboxylate Three hundred milligrams (0.47 millimole) of 2,2,2-trichloroethyl 5,5-dicarbomethoxy-2-phenoxyacetamidocyclopenta[2,3-b]-3-cephem-4-carboxylate sulfoxide was dissolved in 20 ml. of DMF and the solution was cooled to 5°C. Ten equivalents, 642 mg. (4.7 millimole), of phosphorous trichloride were added to the stirred reaction mixture and the reaction was continued at room temperature for about 1 hour. The reaction mixture was taken up in ethyl acetate. The ethyl acetate solution was washed successively, thrice with water, once with saturated sodium chloride, and was dried (Na$_2$SO$_4$). The ethyl acetate was evaporated in vacuo to a residue which was chromatographed on silica gel. Elution with benzene-ethyl acetate (1:1) yielded 164 mg. of 2,2,2-trichloroethyl, 5,5-dicarbomethoxy-6a,7-didehydro-2-phenoxyacetamidocyclopenta[b]cepham-4-carboxylate which was characterized by physical data.
IR (CHCl$_3$); 1793 cm$^{-1}$ ($\beta$-lactam)
The NMR in deuterochloroform showed bands at 1.8–3.2 (4-methylene, ABX, 2p); 3.60 (6-methylene, s, 2p); 3.76 (two 5,5-CH$_3$CO$_2$, s, 6p); 4.1 (3a-methyne, m, 1p); 4.55 (PhOCH$_2$, s, 2p); 4.90 (CCl$_3$CH$_2$CO$_2$, s, 2p); 5.15 (H-2a, d, J-4.0 Hz, 1p); 5.86 $\delta$(H-2, q, J=4.0, 9.0 Hz, 1p).

EXAMPLE 9

Preparation of 5,5-dicarbomethoxy-6a,7-didehydro-2-phenoxyacetamidocyclopenta[b]cepham-7-carboxylic acid The reaction solvent was prepared by mixing 30 ml. of DMF and 5 ml. of glacial acetic acid. One hundred sixty-four milligrams (0.264 millimole) of 2,2,2-trichloroethyl 5,5-dicarbomethoxy-2-phenoxyacetamidocyclopenta[2,3-b]-3-cephem-7-carboxylate was dissolved in 20 ml. of the reaction solvent and cooled to about 15°C. Zinc dust, 164 mg., was added in one lot to the stirred reaction mixture and the reaction was continued for 1.5 hours. The zinc dust was filtered using ethyl acetate as a wash. The ethyl acetate phase was extracted thrice with sodium bicarbonate solution. The sodium bicarbonate extract was layered with ethyl acetate and the basic phase was acidified with 1N hydrochloride acid. The acid product was extracted into the ethyl acetate. The ethyl acetate phase was washed with water and dried (Na$_2$SO$_4$). The ethyl acetate was evaporated in vacuo to yield 52 mg. of 5,5-dicarbomethoxy-6a,7-didehydro-2-phenoxyacetamidocyclopenta[b]cepham-7-carboxylic acid which was characterized by physical data. The NMR in deuterochloroform showed bands at 2.0–3.0 (4-methylene, ABX, 2p); 3.59 (6-methylene, s, 2p); 3.80 (two CH$_3$CO$_2$, s, 6); 4.60 (PhOCH$_2$, s, 2); 5.15 (H-2a, d, J=4.0 Hz, 1p); 5.90 $\delta$ (H-2, q, J=4.0, 9.0 Hz, 1p).

EXAMPLE 10

Preparation of 2,2,2-trichloroethyl 3a-bromo-6a,7-didehydro-2-phenoxyacetamido-5,5-bis(2,2,2-trichloroethoxycarbonyl)cyclopenta[b]cepham-7-carboxylate sulfoxide Five hundred and five milligrams (0.578 millimole) of 2,2,2-trichloroethyl 5,5-bis(2,2,2-trichlorocarboethoxy)-2-phenoxyacetamidocyclopenta[2,3-b]-3-cephem-4-carboxylate sulfoxide, 123 mg. (0.692 millimole) of N-bromosuccinimide and 0.0118 mg. (0.0866 millimole) of azobisisobutyronitrile were dissolved in 50 ml. of carbon tetrachloride. The reaction mixture was degassed under nitrogen using partial vacuum. Atmospheric pressure was restored and the reaction was refluxed at 79°C. for 9 hours. The reaction mixture was evaporated to dryness in vacuo. The residue was chromatographed on silica gel using benzene-ethyl acetate gradient to yield 172 mg. of 2,2,2-trichloroethyl 3a-bromo-6a,7-didehydro-2-phenoxyacetamido-5,5-bis(2,2,2-trichloroethoxycarbonyl)cyclopenta[b]cepham-7-carboxylate sulfoxide which was characterized by physical data.
IR (CHCl$_3$): 1814 cm$^{-1}$ ($\beta$ lactam)
The NMR in deuterochloroform showed bands at 3.36, 3.50 (4-methylene, m(AB), J=16.0, 2p); 4.10 (6-methylene, s, 2p); 4.62 (PhOCH$_2$, s, 2p); 4.84. 4.87 (two 5,5-CCl$_3$CH$_2$CO$_2$, two s, 4p); 4.95 (7-CCl$_3$CH$_2$CO$_2$, s, 2p); 5.52 (H-2a, d, J=5.0 Hz, 1p); 6.22 (H-2, q, J=5.0, 10.0 Hz; 7.85 $\delta$ (NH, d, J=10.0 Hz 1p).

EXAMPLE 11

Preparation of 2,2,2-trichloroethyl 3a,4,6a,7-tetradehydro-2-phenoxyacetamido-5,5-bis(2,2,2-trichloroethoxycarbonyl)cyclopenta[b]cepham-7-carboxylate Five hundred and forty six milligrams (0.640 millimole) of 2,2,2-trichloroethyl 5,5-bis(2,2,2-trichlorocarboethoxy)-2-phenoxyacetamidocyclopenta[2,3-b]-3-cephem-7-carboxylate was dissolved in a mixture of 20 ml. of dichloroethane and 20 ml. of carbon tetrachloride under nitrogen and the solution was cooled to about −40°C. Five milligrams (0.705 millimole) of chlorine gas, dissolved in dichloromethane, were added dropwise in 5 minutes to the stirred reaction mixture. The reaction mixture was maintained at about 0°C. for 10 minutes and then it was refluxed at 49°C. for 30 minutes. The reaction mixture was evaporated to dryness in vacuo. The residue was chromatographed on silica gel using benzene-ethyl acetate gradient to yield 235 mg. of 2,2,2-trichloroethyl 3a,4,6a,7-tetradehydro-2-phenoxyacetamido-5,5-bis(2,2,2- trichloroethoxycarbonyl)cyclopenta[b]cepham-7-carboxylate.

The same product was obtained when 2,2,2-trichloroethyl 3a-bromo-6a,7-didehydro-2-phenoxyacetamido-5,5-bis(2,2,2-trichloroethoxycarbonyl)cyclopenta[b]cepham-7-carboxylate sulfoxide was heated with phosphorus trichloride in DMF under reducing conditions. The Tricyclicdiene-3-cephem ester was characterized by physical data. IR (CHCl$_3$); 1795 cm$^{-1}$ ($\beta$ lactam); uv max (ETOH), 325 mm ($\epsilon$ 12,400). The NMR in deuterochloroform showed bands at 3.83, 4.10 (6-methylene, AB, J=18.0 Hz, 2p); 4.64 (PhOCH$_2$, s, 2p); 4.85 (two 5,5-CCl$_3$CH$_2$CO$_2$, s, 4p); 5.00 (7-CCl$_3$CH$_2$CO$_2$, s, 2p); 5.15 (H-2a, d, J=4.0 Hz, 1p); 5.90 (H-2,q, J=4.0, 10.0 Hz, 1p); 6.59 $\delta$ (H-4-methyne, s, 1p).

EXAMPLE 12

Preparation of 5,5-dicarboxy-3a,4-didehydro-2-phenoxyacetamidocyclopenta[b]cepham-7-carboxylic acid The reaction solvent was prepared by mixing 30 ml. of DMF and 5 ml. of glacial acetic acid. Two hundred and thirty five milligrams (0.274 millimole) of 2,2,2-trichloroethyl 5,5-dicarboxy-2-phenoxyacetamido-3a,4-didehydrocyclopenta[2,3-b]cepham-7-carboxylate was dissolved in 20 ml. of the reaction solvent. The reaction mixture was cooled to about 5°C. and 235 mg. of zinc dust was added to the stirred mixture. The reaction was continued in cold for about 1.5 hours. The reaction mixture was taken up in ethyl acetate and the zinc was filtered using ethyl acetate as a wash. The filtrate was extracted thrice with sodium bicarbonate solution. The ethyl acetate phase was washed with saturated sodium chloride solution and dried (Na$_2$SO$_4$). The ethyl acetate was evaporated in vacuo to provide 95 mg. of 5,5-dicarboxy-3a,4-didehydro-2-phenoxyacetamidocyclopenta[b]cepham-7-carboxylic acid.

EXAMPLE 13

Preparation of 2,2,2-trichloroethyl 3-bromomethyl-2-[2,2-bis-(2,2,2-trichloroethoxycarbonyl)ethyl]-7-phenoxyacetamido-3-cephem-4-carboxylate sulfoxide Twenty-two grams (25.2 millimole) of 2,2,2-trichloroethyl 2-[2,2-bis(2,2,2-trichloroethoxycarbonyl)ethyl]-3-methyl-7-phenoxyacetamido-3-cephem-4-carboxylate sulfoxide, 7.66 g. (43.0 millimole) of N-bromosuccinimide and 1.04 g. (7.59 millimole) of azobisisobutyronitrile were dissolved in 500 ml. of dichloroethane. The reaction mixture was degassed under nitrogen with partial vacuum. Atmospheric pressure was restored and the reaction mixture was refluxed at 84°C. for 8 hours under a sun lamp. The reaction mixture was evaporated to dryness in vacuo. The residue was chromatographed on silica gel using benzene-ethyl acetate (1:1) gradient to yield 12.16 g. of 2,2,2-trichloroethyl 3-bromomethyl-2-[2,2-bis(2,2,2-trichloroethoxycarbonyl)ethyl]-7-phenoxyacetamido-3-cephem-4-carboxylate sulfoxide which was characterized by physical data.
IR (CHCl$_3$); 1810 cm$^{-1}$ ($\beta$ lactam)

The NMR in deuterochloroform showed bands at 1.4–3.0 (adduct methylene, m, 2p): 3.8–4.2 (2-methyne + adduct methyne, m, 2p); 4.53 (3CH$_2$Br, s, 2p); 4.57 (PhOCH$_2$, s, 2p) 4.70 (H-6, d, J=5.0 Hz, 1p); 4.84, 4.90 (three CCl$_3$CH$_2$Cl$_2$, s, 6p); 6.22 (H-7, q, J=5.0, 10.0 Hz, 1p); 7.82 $\delta$ (NH, d, J=10.0 Hz, 1p).

EXAMPLE 14

Preparation of 2,2,2-trichloroethyl 6a,7-didehydro-2-phenoxyacetamido-5,5-bis(2,2,2-trichloroethoxycarbonyl)cyclopenta[b]-cepham-7-carboxylate sulfoxide One equivalent, 20.93 g. (21.9 millimole), of 2,2,2-trichloroethyl 3-bromomethyl-2-[2,2-bis(2,2,2-bis(2,2,2-trichloroethoxycarbonyl)ethyl]-7-phenoxyacetamido-3-cephem-4-carboxylate sulfoxide was dissolved in 500 ml. of DMF under nitrogen with stirring. The reaction mixture was cooled (−20°C. and 1.05 g. (21.9 millimole) of sodium hydride as a 50% mineral oil suspension was added in one lot to the cold reaction mixture. The reaction was continued for 1 hour at about 0°C. The reaction mixture was cooled (−10°C.) and 100 ml. of 1N hydrochloric acid was added dropwise. During the acid addition the reaction temperature rose to 0°C. and the color of the reaction mixture changed from brown to light yellow. The reaction was taken up in ethyl acetate and washed five times successively with water, sodium chloride solution and 1N hydrochloric acid. The ethyl acetate phase was then washed successively twice with dilute sodium chloride solution and once with saturated sodium chloride solution and was dried (Na$_2$SO$_4$). The ethyl acetate was evaporated in vacuo to a frothy residue. The residue was chromatographed on silica gel using benzene-ethyl acetate (1:1) gradient to yield 12.0 g of 2,2,2-trichloroethyl 6a, 7-didehydro-2-phenoxyacetamido-5,5-bis(2,2,2-trichloroethoxycarbonyl)cyclopenta[b]cepham-7-carboxylate sulfoxide which was characterized by physical data. IR(CHCl$_3$); 1808 cm$^{-1}$ ($\beta$ lactam); uv max (ETOH), 270 nm ($\epsilon$ 6320). The NMR in deuterochloroform showed bands at 2.3–3.3 (4-methylene, m(ABX), 2p); 3.76 (3a-methylene + 6-methylene, s(broad), 3p); 4.58 (PhOCH$_2$, s, 2p); 4.92 (H-2a, d, J=4.0 Hz, 1p); 4.85 (two 5,5-CCl$_3$CH$_2$CO$_2$, s, 4p); 5.0 (7-CCl$_3$CH $_2$CO$_2$, s, 2p); 6.11 (H-2, J=4.0, 10.0 Hz); 7.82 $\delta$ (NH, d, J=10.0 Hz, 1p).

EXAMPLE 15

Preparation of 2,2,2-trichloro 6a,7-didehydro-2-phenoxyacetamido-5,5-bis(2,2,2-trichloroethoxycarbonyl)cyclopenta[b]-cepham-7-carboxylate 2,2,2-Trichloroethyl 5,5-di(2,2,2-trichlorocarboethoxy)-2-phenoxyacetamidocyclopenta[2,3-b]-3-cepham-7-carboxylate sulfoxide, 3.09 g. (3.53 millimole), was dissolved in 60 ml. of DMF and the solution was cooled to about 5°C. Ten equivalents, 3.08 ml., 4.83 g. (35.3 millimole) of phosphorus trichloride was added dropwise to the stirred reaction mixture. The reaction was continued for 1 hour at room temperature. The reaction mixture was taken up in ethyl acetate and the organic phase was washed successively thrice with dilute sodium chloride solution. The ethyl acetate solution was dried (Na$_2$SO$_4$) and evaporated to dryness in vacuo. The residue was chromatographed on silica gel using benzene-ethyl acetate gradient to yield 2.432 g. of 2,2,2-trichloro-6a,7-didehydro-2-phenoxyacetamido-5,5-bis(2,2,2-trichloroethoxycarbonyl)cyclopenta[b]cepham-7-carboxylate which was characterized by physical data. IR (CHCl$_3$); 1795 cm$^{-1}$ ($\beta$ lactam) The NMR in deuterochloroform showed bands at 2.0–3.4 (4-methylene, m, 2p); 3.83 (6-methylene, s, 2p); 3.8–4.3 (3a-methyne, m,1p); 4.60 (PhOCH$_2$, S, 2p); 4.90 (two 5,5-CCl$_3$CH$_2$CO$_2$, s, 4p); 5.00 (7-CCl$_3$CH$_2$CO$_2$, s, 2p); 5.20 (H-2a, d, J=5.0 Hz, 1p); 5.95 $\delta$ (H-2, q, J=5.0, 10.0 Hz, 1p).

EXAMPLE 16

Preparation of 5,5-Dicarboxy 6a,7-didehydro-2-phenoxyacetamidocyclopenta[b]cepham-7-carboxylic acid Six hundred and six milligrams (0.709 millimole) of 2,2,2-trichloroethyl 5,5-di)2,2,2-trichlorocarboethoxy)-2-phenoxyacetamidocylopenta[2,3-b]-3-cephem-7-carboxylate was dissolved in 20 ml. of solvent prepared by mixing 30 ml. of DMF and 5 ml. of glacial acetic acid. The reaction mixture was stirred and cooled to about 5°C. Six hundred and six milligrams of zinc dust was added to the reaction mixture in one lot and the reaction was continued for 1.5 hours in the cold. Ethyl acetate was added to the reaction mixture and the zinc dust was filtered using ethyl acetate as a wash. The ethyl acetate filtrate was extracted thrice with saturated sodium bicarbonate solution. The ethyl acetate phase was washed with saturated sodium chloride solution and dried (Na$_2$SO$_4$). The ethyl acetate was evaporated in vacuo to provide 13 mg. of starting material. The basic aqueous phase was layered with ethyl acetate and acidified with 1N hydrochloric acid. The acid product was extracted into the ethyl acetate. The ethyl acetate phase was washed with saturated sodium chloride solution and dried (Na$_2$SO$_4$). The ethyl acetate was evaporated in vacuo to yield 311 mg. of 5,5-dicarboxy-6a,7-didehydro-2-phenoxyacetamidocyclopenta[b]cepham-7-carboxylic acid.

The tricarboxylic-3-cephem acid was characterized by conversion to methyl 5,5-dicarbomethoxy-6a,7-didehydro-2-phenoxyacetamidocyclopenta[b]cepham-7-carboxylate by reaction with diazomethane.

The NMR in deuterochloroform showed bands at 1.8 – 3.2 (4-methylene, m, 2p); 3.57 (6-methylene, s, 2p); 3.73 (two 5,5-CH$_3$CO$_2$, s, 6p); 3.92 (7-CH$_3$CO$_2$, s, 3p); 4.60 (PhOCH$_2$, s, 2p); 5.10 (H-2a, d, J=5.0 Hz); 5.90 $\delta$ (H-2, q, J=5.0, 10.0 Hz, 1p).

The above NMR compared favorably with the NMR of 5,5-dicarbomethoxy 6a,7-didehydro-2-phenoxyacetamidocyclopenta[b]cepham-7-carboxylic acid of Example 9.

I claim:
1. A compound of the formula

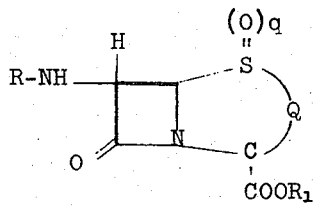

wherein
R is hydrogen, C$_1$–C$_8$ alkanoyl, benzoyl, or a group represented by the formula:

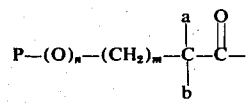

wherein
P is 2-thienyl, 3-thienyl, 2-furyl, 3-furyl, phenyl or phenyl substituted by amino, protected amino, C$_1$–C$_4$ lower alkyl, C$_1$–C$_4$ lower alkoxy, halogen, hydroxy, or protected hydroxy;
a is hydrogen or C$_1$–C$_3$ alkyl;
b is hydrogen or C$_1$–C$_3$ alkyl, amino, protected amino, hydroxy or protected hydroxy;
m is 0 or an integer from 1 to 3;
n is 0 or 1;
subject to the limitation that when n is 1,
P is phenyl or phenyl substituted by amino, protected amino, C$_1$–C$_4$ lower alkyl, C$_1$–C$_4$ lower alkoxy, halogen, hydroxy, or protected hydroxy; and
b is hydrogen or C$_1$–C$_3$ alkyl;
R$_1$ is hydrogen, a carboxylic acid protecting group, or an alkali metal or alkaline earth metal cation;
q is 0 or 1;
Q is

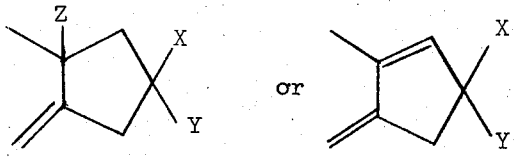

wherein
X and Y are independently acetyl, benzoyl, carbethoxy, carbomethoxy, carboxy, cyano or 2,2,2-trichloroethoxycarbonyl; and
Z is hydrogen or bromine;
subject to the limitations that when Z is bromine, q is 1 and X and Y are other than carboxy or cyano; and subject to the further limitation that q is 0 when Q is

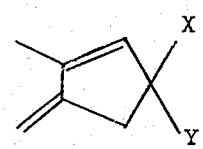

2. The compound of claim 1 wherein Q is

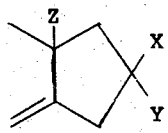

3. The compound of claim 2 wherein Z is hydrogen.
4. The compound of claim 3 which is 2,2,2-trichloroethyl 6a,7-didehydro-2-phenoxyacetamido-5,5-bis(2,2,2- trichloroethoxycarbonyl)cyclopenta[b]cepham-7-carboxylate.

5. The compound of claim 3 which is 5,5-dicarboxy-6a,7-didehydro-2-phenoxyacetamidocyclopenta[b]cepham-7-carboxylic acid.

6. The compound of claim 3 which is 5,5-dicarbomethoxy-6a,7-didehydro-2-phenoxyacetamidocyclopenta[b]cepham-7-carboxylic acid.

7. The compound of claim 3 wherein $q$ is 1.

8. The compound of claim 7 which is 2,2,2-trichloroethyl 6a,7-didehydro-2-phenoxyacetamido-5,5-bis(2,2,2-trichloroethoxycarbonyl)cyclopenta[b]cepham-7-carboxylate sulfoxide.

9. The compound of claim 1 wherein Q is

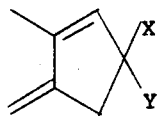

10. The compound of claim 9 which is 2,2,2-trichloroethyl 3a,4,6a,7-tetradehydro-2-phenoxyacetamido-5,5-bis(2,2,2-trichloroethoxycarbonyl)cyclopenta[b]cepham-7-carboxylate.

11. The compound of claim 9 which is 5,5-dicarboxy-3a,4,6a,7-tetradehydro-2-phenoxyacetamidocyclopenta[b]cepham-7-carboxylic acid.

12. The process for preparing the compound of claim 7, wherein R and $R_1$ are other than hydrogen, which comprises reacting in a substantially anhydrous inert solvent at a temperature between −40°C. and 20°C., a compound of the formula

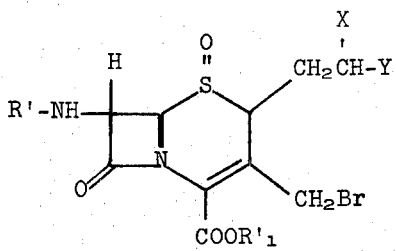

with a molar equivalent of base, wherein the foregoing formula,

R' is $C_1-C_8$ alkanoyl, benzoyl, or a group represented by the formula:

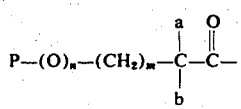

wherein
P is 2-thienyl, 3-thienyl, 2-furyl, 3-furyl, phenyl or phenyl substituted by amino, protected amino, $C_1-C_4$ lower alkyl, $C_1-C_4$ lower alkoxy, halogen, hydroxy, or protected hydroxy;
$a$ is hydrogen or $C_1-C_3$;
$b$ is hydrogen or $C_1-C_3$ alkyl, amino, protected amino, hydroxy or protected hydroxy;
$m$ is 0 or an integer from 1 to 3;
$n$ is 0 or 1;
Subject to the limitation that when $n$ is 1,
P is phenyl or phenyl substituted by amino, protected amino, $C_1-C_4$ lower alkyl, $C_1-C_4$ lower alkoxy, halogen, hydroxy, or protected hydroxy; and
$b$ is hydrogen or $C_1-C_3$ alkyl;
$R'_1$ is a carboxylic acid protecting group, or an alkali metal or alkaline earth metal cation; and
X and Y are independently acetyl, benzoyl, carbethoxy, carbomethoxy, carboxy, cyano or 2,2,2-trichloroethoxycarbonyl.

13. The process of claim 12 wherein the base is sodium hydride.

14. The process of claim 12 wherein R' is phenoxyacetyl, $R'_1$ is 2,2,2-trichloroethyl, and X and Y are both 2,2,2-trichlorocarbethoxy.

15. The process for preparing the compound of claim 9, wherein R and $R_1$ are other than hydrogen, which comprises reacting in a substantially anhydrous solvent at a temperature between −40°C. to about 50°C., a compound of the formula

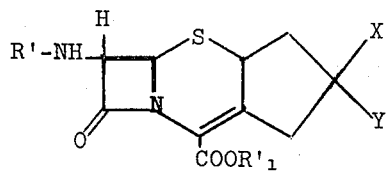

with a molar equivalent of chlorine gas, wherein the foregoing
R' is $C_1-C_8$ alkanoyl, benzoyl, or a group represented by the formula:

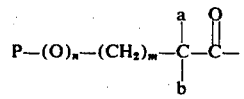

wherein
P is 2-thienyl, 3-thienyl, 2-furyl, 3-furyl, phenyl or phenyl substituted by amino, protected amino, $C_1-C_4$ lower alkyl, $C_1-C_4$ lower alkoxy, halogen, hydroxy, or protected hydroxy;
$a$ is hydrogen or $C_1-C_3$ alkyl;
$b$ is hydrogen or $C_1-C_3$ alkyl, amino, protected amino, hydroxy or protected hydroxy;
$m$ is 0 or an integer from 1 to 3;
$n$ is 0 or 1;
Subject to the limitation that when $n$ is 1,
P is phenyl or phenyl substituted by amino, protected amino, $C_1-C_4$ lower alkyl, $C_1-C_4$ lower alkoxy, halogen, hydroxy, or protected hydroxy; and
$b$ is hydrogen or $C_1-C_3$ alkyl;
R' is a carboxylic acid protecting group, or an alkali metal or alkaline earth metal cation; and
X and Y are independently acetyl, benzoyl, carbethoxy, carbomethoxy, carboxy, cyano or 2,2,2-trichloroethoxycarbonyl.

16. The process of claim 15 wherein R' is phenoxyacetyl, $R'_1$ is 2,2,2-trichloroethyl, and X and Y are 2,2,2-trichlorocarbethoxy.

* * * * *

UNITED STATES PATENT AND TRADEMARK OFFICE
CERTIFICATE OF CORRECTION

PATENT NO. : 3,907,785                             Page 1 of 3
DATED     : September 23, 1975
INVENTOR(S) : Douglas O. Spry It is certified that error appears in the above-identified patent and that said Letters Patent are hereby corrected as shown below:

In column 6, line 15, "hydrlytic" should read --hydrolytic--.

In column 10, lines 25 and 26, "7-(N-t-butyloxy-carbonylphenylglycylamido)-2-[2,2-(2,2,2-trichloroethylethoxy-carbonyl)ethyl]-3-cephem-4-" should read --
    7-(N-t-butyloxcarbonylphenylglycylamido)-2-[2,2-bis(2,2,2-trichloroethoxycarbonyl)ethyl]-3-cephem-4- --.

In column 11, lines 60-68, the formula

" 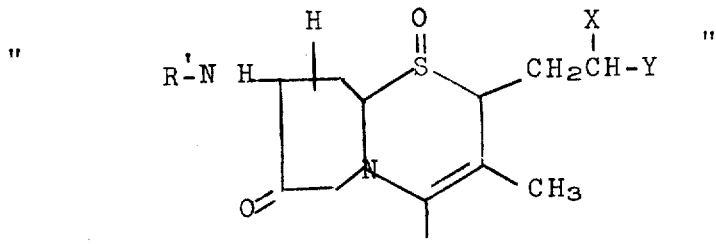 "

should read

UNITED STATES PATENT AND TRADEMARK OFFICE
CERTIFICATE OF CORRECTION

PATENT NO. : 3,907,785   Page 2 of 3
DATED : September 23, 1975
INVENTOR(S) : Douglas O. Spry It is certified that error appears in the above-identified patent and that said Letters Patent are hereby corrected as shown below:

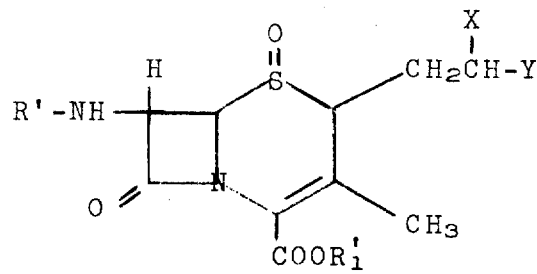

In column 12, lines 5-15, the formula

" 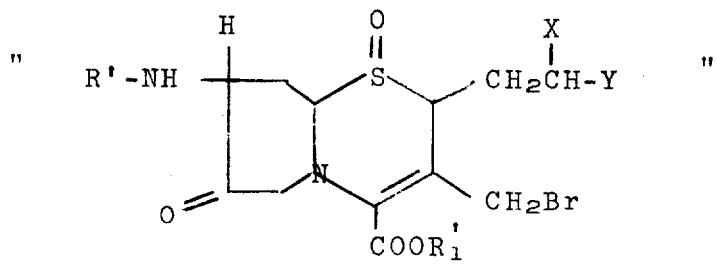 "

should read

UNITED STATES PATENT AND TRADEMARK OFFICE
CERTIFICATE OF CORRECTION

PATENT NO. : 3,907,785
DATED : September 23, 1975
INVENTOR(S) : Douglas O. Spry

It is certified that error appears in the above-identified patent and that said Letters Patent are hereby corrected as shown below:

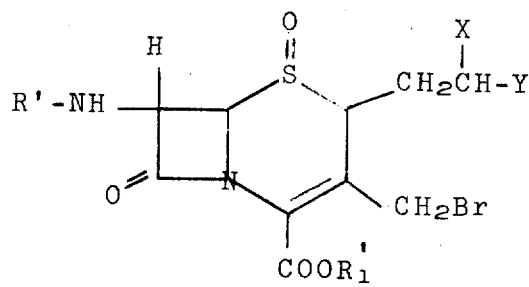

In column 15, line 31, "reaction was" should read --reaction mixture was--.

In column 16, line 18, "PhOCH₂,5," should read --PhOCH$_2$, s,--.

Signed and Sealed this twenty-fourth Day of February 1976

[SEAL]

Attest:

RUTH C. MASON
Attesting Officer

C. MARSHALL DANN
Commissioner of Patents and Trademarks